United States Patent
Oliver (10) Patent No.: US 9,716,798 B2
(45) Date of Patent: Jul. 25, 2017

(54) ACR BUFFERING IN THE CLOUD

(71) Applicant: AT&T Intellectual Property I, L.P., Atlanta, GA (US)

(72) Inventor: James Oliver, Alabaster, AL (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 360 days.

(21) Appl. No.: 14/480,248

(22) Filed: Sep. 8, 2014

(65) Prior Publication Data

US 2016/0072962 A1     Mar. 10, 2016

(51) Int. Cl.
*H04M 15/00*     (2006.01)
*H04L 29/06*     (2006.01)

(52) U.S. Cl.
CPC ........ *H04M 15/58* (2013.01); *H04L 65/1016* (2013.01); *H04M 15/41* (2013.01); *H04M 15/57* (2013.01); *H04M 15/62* (2013.01); *H04M 15/74* (2013.01)

(58) Field of Classification Search
None
See application file for complete search history.

(56) References Cited

U.S. PATENT DOCUMENTS

| 7,231,024 | B2 | 6/2007 | Moisey |
| 8,126,123 | B2 | 2/2012 | Cai et al. |
| 8,468,120 | B2 | 6/2013 | Gupta et al. |
| 8,493,213 | B2 | 7/2013 | Holley et al. |
| 8,620,262 | B2 | 12/2013 | Cai et al. |
| 8,737,953 | B2 | 5/2014 | Sharma et al. |
| 8,880,941 | B1 * | 11/2014 | Reiss ................ G06F 17/30958 707/649 |
| 2006/0139069 | A1 * | 6/2006 | Frank ........................ G06F 1/30 327/143 |
| 2008/0080372 | A1 | 4/2008 | Cai et al. |
| 2012/0030077 | A1 | 2/2012 | Pei et al. |
| 2012/0221445 | A1 | 8/2012 | Sharma |
| 2012/0221700 | A1 * | 8/2012 | Dutta .................. H04L 43/0817 709/223 |
| 2013/0110565 | A1 | 5/2013 | Means, Jr. et al. |
| 2013/0311598 | A1 * | 11/2013 | Arrouye .............. H04L 67/1097 709/217 |

(Continued)

FOREIGN PATENT DOCUMENTS

WO     2011113261 A1     9/2011

OTHER PUBLICATIONS

Rushil Dave, "Mobile Virtual Network Operator Systems on Cloud: An Architectural and Cost-benefit Study", Aalto University, Espoo, Finland, Aug. 8, 2011.

(Continued)

*Primary Examiner* — Yaotang Wang (57) ABSTRACT

A network element of an Internet Protocol multimedia subsystem buffers network resource usage information in the cloud. After generating network resource usage information based on an observation of network resource usage, the network element transmits the network resource usage information to a cloud-based storage service for buffering. Once a network resource usage collection function is available, the network element retrieves the network resource usage information from the cloud-based storage service and transmits it to a charging collection function for generation of call detail records.

17 Claims, 5 Drawing Sheets

(56) References Cited

U.S. PATENT DOCUMENTS

| | | |
|---|---|---|
| 2014/0201824 A1 | 7/2014 | Agbabian |
| 2015/0189097 A1* | 7/2015 | Sharma ............... H04M 15/65 |
| | | 370/259 |
| 2016/0209838 A1* | 7/2016 | Uchida ............... G07C 5/008 |

OTHER PUBLICATIONS

"S-GW Administration Guide, Star OS Release 16", Cisco, San Jose, CA, Apr. 30, 2014.

* cited by examiner

ACR BUFFERING IN THE CLOUD

TECHNICAL FIELD

The present disclosure relates to the collection of network resource usage information. More specifically, the disclosure is directed to buffering of charging or network resource usage information by network elements before the information is transmitted to a charging collection function for generation of call detail records or the performance of network analysis and management.

BACKGROUND

In today's Internet Protocol multimedia subsystem (IMS) network environment, network elements that provide information such as the accounting requests (ACRs) defined in the Diameter computer networking protocol for the generation of call detail records (CDRs) rely on local host storage for buffering ACRs until the charging collection function (CCF) system responsible for CDR generation is available for processing the data.

Local buffering of the ACRs results in inadequate buffering capacity if local resources are insufficient. There is a need to ensure sufficient buffering capacity for all IMS network elements.

The local resources used for buffering at the network elements often lack fault tolerance or have insufficient fault tolerance. There is a need to guarantee fault tolerance for buffering at IMS network elements.

In the event of a host failure, data that is buffered locally at the host is most likely lost. There is a need to prevent the loss of buffered data during a host failure.

In a virtualized environment where a host virtual machine can be moved from one location to another, it is furthermore important that data that is buffered at the time of the move is not lost.

SUMMARY

The needs existing in the field are addressed by the present disclosure, which relates to cloud-based buffering of information about network resource usage in an Internet Protocol multimedia subsystem.

Exemplary embodiments of the invention feature a method for providing network resource usage information. By a network element of the Internet Protocol multimedia subsystem, network resource usage information is generated based on an observation of network resource usage. The network resource usage information is transmitted to a cloud-based storage service for buffering. The network resource usage information is then retrieved from the cloud-based storage service and transmitted to a charging collection function for generation of call detail records.

In other embodiments, it is determined that a charging collection function is available before retrieving the network resource usage information from the cloud-based storage service. The network resource usage information may be a Diameter Accounting Request message. Retrieving the network resource usage information from the cloud-based storage service may be performed periodically.

In other aspects of the disclosure, the method may include moving the network element of the Internet Protocol multimedia subsystem from a first virtualized host to a second virtualized host, in which case transmitting the network resource usage information is performed by the first virtualized host before the moving, and retrieving the network resource usage information is performed by the second virtualized host after the moving.

Generating network resource usage information based on an observation of network resource usage may be performed by a charging trigger function of the network element. The method may further include, by the charging collection function, generating call detail records from the network resource usage information, and transmitting the call detail records to an operations support system or business support system.

In another aspect of the disclosure, a network element of an Internet Protocol multimedia subsystem is provided. The network element includes a processor, a network interface, and a computer readable storage device having stored thereon computer readable instructions that, when executed by the processor, cause the processor to perform operations as described above.

An additional embodiment of the present disclosure is a tangible computer-readable medium having stored thereon computer readable instructions for providing network resource usage information for network resource usage in an Internet Protocol multimedia subsystem, wherein execution of the computer readable instructions by a processor causes the processor to perform operations as described above.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF EXEMPLARY EMBODIMENTS

Network resource usage information is collected as the network resources are used, and the information is passed through a chain of logical charging functions to be used for network management and billing. As the information is accumulated at a network element, the information must often be buffered until a charge collection function is available for offloading the information. Network elements in today's typical IMS network environment buffer that information on-site, in disk arrays or other storage.

Figure 1A:
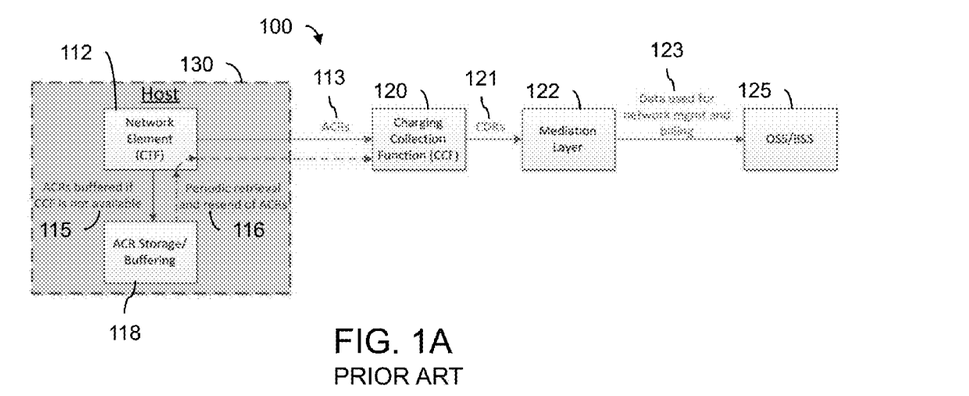
FIGS. 1A and 1B are a schematic diagrams showing a prior art network arrangement for buffering network resource usage information in an IP multimedia subsystem.

An example of a network usage information data flow in a current IMS network environment is illustrated in the flow diagram 100 of FIG. 1A. A network element 112 provides the network usage information, such as Diameter ACRs 113, to a charging collection function (CCF) 120 for the generation of CDRs 121. The CDRs are then transmitted to a mediation layer 122 that transmits data 123 for use in network management and billing to an operations support system or business support system 125.

The network element 112 relies on local storage 118 within the same host 130 for buffering ACRs until the CCF 120 responsible for CDR generation is available for processing the data. If the CCF 120 is not available, then the ACRs are buffered (arrow 115). When a charge collection function becomes available, then the ACRs are retrieved by the network element 112 from the local storage 118 and sent (arrow 116) to the CCF 120. The retrieval and sending may be done periodically on a schedule, or may be done in an ad hoc manner as a CCF 120 becomes available.

Figure 1B:
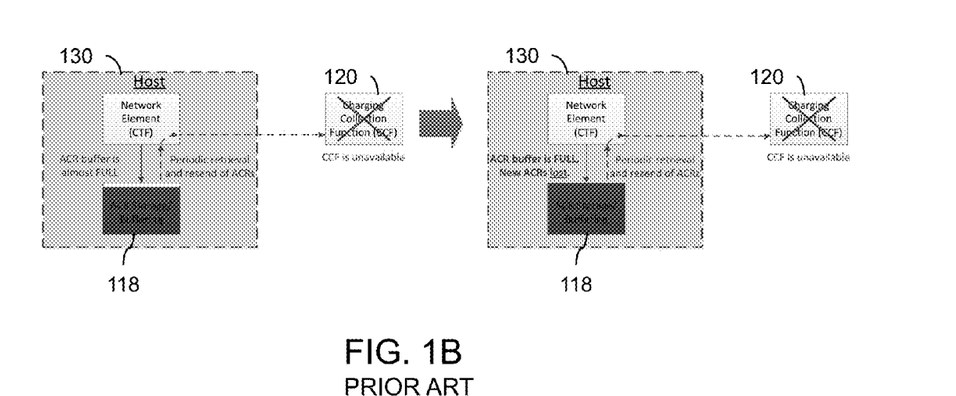

Relying on local storage for ACR buffering, however, presents several problems. If there is insufficient storage available on the local host 130 to accommodate ACR buffering, the on-site buffering arrangement described above fails to preserve all data. That problem is especially severe when a CCF 120 is not available to receive the ACRs for an extended period. Normally, there is limited local storage available in a network element, and that storage may be further limited for use in buffering ACRs, because capacity must be set aside for the application, configuration data, and call processing needs. As shown in FIG. 1B, if the CCF 120 is unavailable for a longer-than-expected time, or if the volume of ACRs is unexpectedly large, then the ACR storage/buffering local storage 118 will reach capacity. That increases the probability of incomplete data and eventually a loss of data, which will likely result in lost revenue as billing opportunities are missed.

Increasing the amount of local storage 118 is often not possible due to constraints of the host hardware 130. Further, the addition of a dedicated external disk array to satisfy the need for a particular host can be prohibitively expensive.

In the arrangement shown in FIGS. 1A and 1B, the local host storage 118 typically lacks fault tolerance or has insufficient fault tolerance. Specifically, local host storage often does not include a fault tolerance mechanism, such as a redundant array of independent disks (RAID). With insufficient fault tolerance, there is a greater chance of losing data. The addition of fault tolerance capabilities to the local storage solution may not always be possible, depending on the hardware used in the host 130 and in the local storage 118. A dedicated external disk array can provide sufficient fault tolerance, but as noted previously, it is expensive.

The currently-used buffering arrangement further provides little protection against the loss of buffered data in the event of a host failure. If the host equipment fails and the network element is moved to a new host, the transfer of buffered data to that new equipment is expensive and often not possible.

If the host 130 is instantiated in a virtualized environment, there is a potential loss of data when the network elements, as virtual machines (VMs) running on one or more hosts, are moved (re-instantiated) to another host or group of hosts. A virtual machine may be moved to a new host for many reasons, including host failure, re-balancing or a growth/de-growth exercise. It is important to maintain the integrity of buffered data during those moves.

In order to reduce expense and provide a more fault tolerant and scalable methodology of buffering usage data, the method disclosed herein utilizes storage available in the cloud for buffering that data until it can be properly processed. The "cloud" refers to shared computing resources that achieve coherence and economies of scale, similar to a utility (like the electricity grid), over a network. The cloud takes advantage of converged infrastructure and shared services. Cloud services, such as cloud-based data storage and the hosting of virtual machines, are available as commodities in today's computing market. Connectivity to cloud-based services is available via already defined interfaces such as the Internet Small Computer System Interface (iSCSI).

The disclosed method replaces local host storage currently used by IMS hosts to buffer the data. As noted above, that local host storage is often limited in size, and is not available if the host fails, or if the application is moved to another host as in a virtualized environment.

Figure 2:
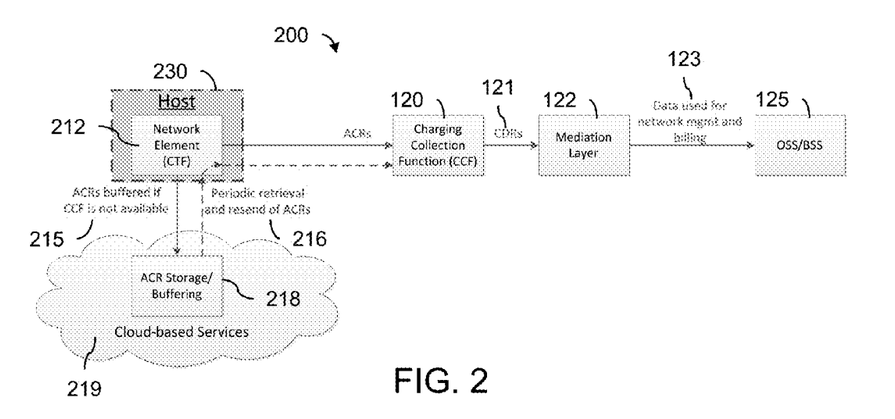
FIG. 2 is a schematic diagram showing a network arrangement for buffering network resource usage information in an IP multimedia subsystem in accordance with embodiments of the present disclosure.

An exemplary embodiment of the presently disclosed arrangement for providing network usage information is presented in the flow diagram 200 of FIG. 2. A network element 212 determines usage information based on network resource usage, and provides that information to the charging collection function 120 for the generation of CDRs 121. The CDRs are handled as described above with reference to FIG. 1A.

Instead of relying on local storage within the host 230 for buffering ACRs, the network element 212 instead transmits the ACRs (at arrow 215) to a cloud-based storage/buffering service 218 in the cloud 219. When the charge collection function 120 becomes available, then the ACRs are retrieved by the network element 212 from the cloud-based storage/buffering service 218 and sent (arrow 216) to the CCF 120.

The network element 212 may, before learning the status of the charge collection function 120, attempt to transmits the ACRs to the CCF and also store them in the cloud in parallel. That approach allows for a more immediate attempt to provide the usage detail to the CCF, while protecting the usage detail in the event the CCF is unavailable.

Another approach is for the network element to initially attempt to send the data to the CCF. Then, only if the CCF is unavailable, the network element sends the data to the cloud. While that approach creates a window of time during which the data could be potentially be lost if the network element were to fail, the window would be extremely small. Cloud storage would still be used to buffer the data whenever the CCF is unavailable, but the cloud buffer would not be used unnecessarily when the CCF is immediately available. Any of the above configurations may be achieved if provided sufficient configuration parameters to govern the storage of the net resource usage data.

Placing the ACR buffering in the cloud, as opposed to performing that function locally, provides several benefits. The cloud-based storage/buffering service 218 typically offers a much greater amount of storage space. Cloud-based storage additionally provides more flexibility with the capability of adding more storage space when needed with minimal to no impact on the network.

Buffering in the cloud additionally results in more efficient use of storage space for a given network because the cloud-based storage can be used by all of the network elements in the network for ACR buffering instead of allocating dedicated local storage for each element. Statistical techniques can be used to permit the cloud-based buffering capacity to be lower than the total of the capacities of individual local buffers that would otherwise be needed to provide the same level of buffering protection.

The network elements can furthermore be reduced in complexity because they can focus on call processing functions and rely on cloud-based services where it is reasonable. Additionally, cloud-based storage already includes a high level of fault tolerance to prevent loss of data.

Cloud-based storage is accessible from multiple hosts, allowing the network element applications to be portable among available hosts. This aids in the move to a virtualized environment. In moving to a virtualized environment, the benefit of using cloud-based buffering storage is even greater because virtual machines (VMs) that contain the network element applications may be moved from one host to another. That move may be automatic in some cases. For example, a network element VM 312 instantiated in host 330, shown in FIG. 3A, may be moved to host 331 shown in FIG. 3B. The move may be an automated move prompted by a failure in the host 330, or by a service or upgrade procedure.

Configuration parameters may be provided to govern the point in time when the network element removes the network resource usage data from the cloud. One approach is to clear the buffer when the CCF successfully acknowledges that the network resource usage data was received and is being processed. Another approach is to leave the data in the cloud in case there is a need for an OSS to analyze the data in real time, in which case the data could be made available for the OSS to retrieve from the cloud.

Figure 3A:
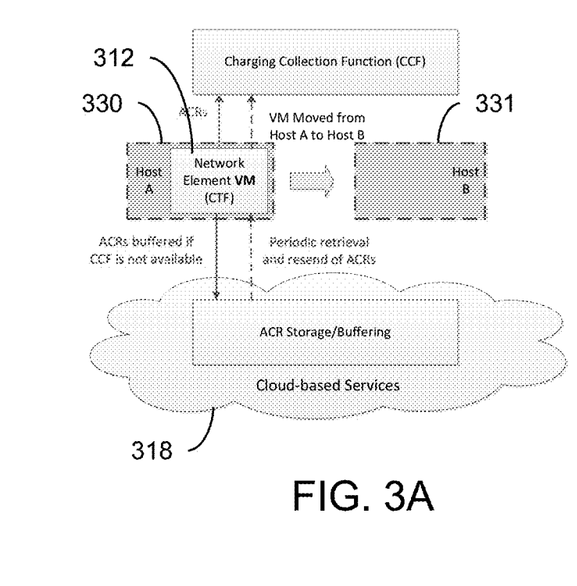
FIGS. 3A and 3B are schematic diagrams showing migration of a network element virtual machine from host to host in accordance with embodiments of the present disclosure.
Figure 3B:
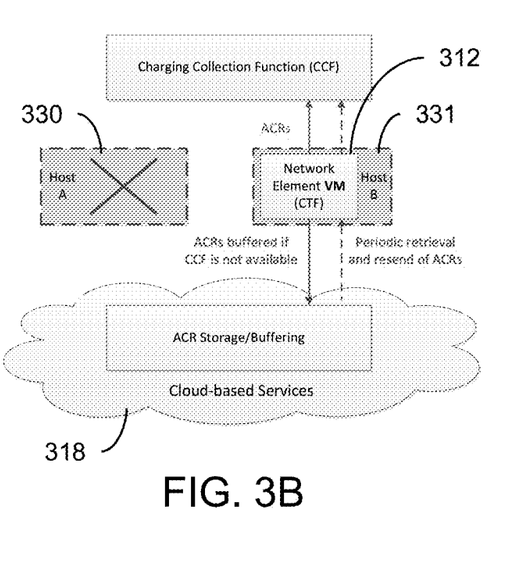

As FIGS. 3A and 3B illustrate, even when the network element VM 213 is moved from host 330 to host 331, access to ACRs buffered in a cloud-based storage service 318 remains the same. The VM on host 331 can continue processing the buffered ACRs regardless of its host location. In a virtualized environment such a move may be automated, and utilizing cloud storage helps with making that move as transparent as possible. In contrast, if local host storage was used for ACR buffering in the virtualized environment, when the network element VM 312 is moved from host 330 to host 331, the network element VM would lose access to the local storage on host 330, resulting in a loss of data.

Figure 4:
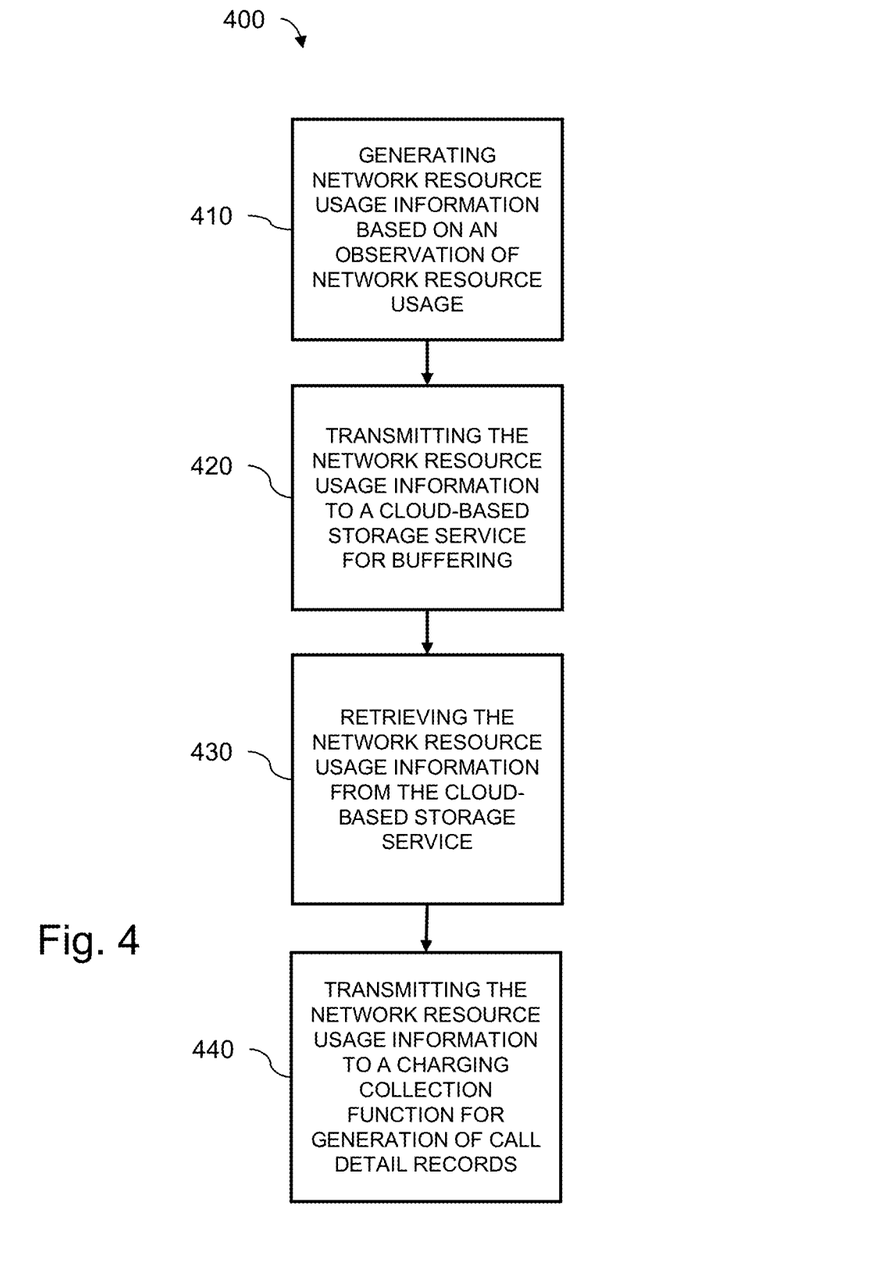
FIG. 4 is a flow chart showing a method in accordance with embodiments of the present disclosure.

An example method for providing network resource usage information in accordance with the present disclosure is illustrated by the flow chart 400 of FIG. 4. The method is performed, for example, by a network element in an Internet Protocol multimedia subsystem. The network resource usage information is initially generated at block 410 based on an observation of network resource usage. For example, the network resource usage information may include the time, length, origin and destination of a voice communication. The network resource usage information may be an Accounting Request command (ACR) under the Diameter authentication, authorization and accounting protocol, and may be generated by a charging trigger function of the network element.

The network resource usage information is then transmitted at block 420 to a cloud-based storage service for buffering. The transmission may be via the Internet Small Computer System Interface (iSCSI) or another similar interface used in data storage applications.

At block 430, the network resource usage information is retrieved from the cloud-based storage service. The retrieval of the network resource usage information may be periodic, and may be done only after a determination is made that a charging collection function is available.

Once the network resource usage information is retrieved, it is transmitted at block 440 to a charging collection function for generation of call detail records. Those call detail records are transmitted to an operations support system or business support system, which bills customers or performs analysis based on those records.

It can be seen that, without causing disruption of the buffering function, the network element may be moved from virtualized host to virtualized host during the time between transmitting to the buffer (block 420) and retrieving from the buffer (block 430). The data buffered by the network element at the first virtualized host may be retrieved from the buffer by the network element at the second virtualized host without any data loss.

System

Figure 5:
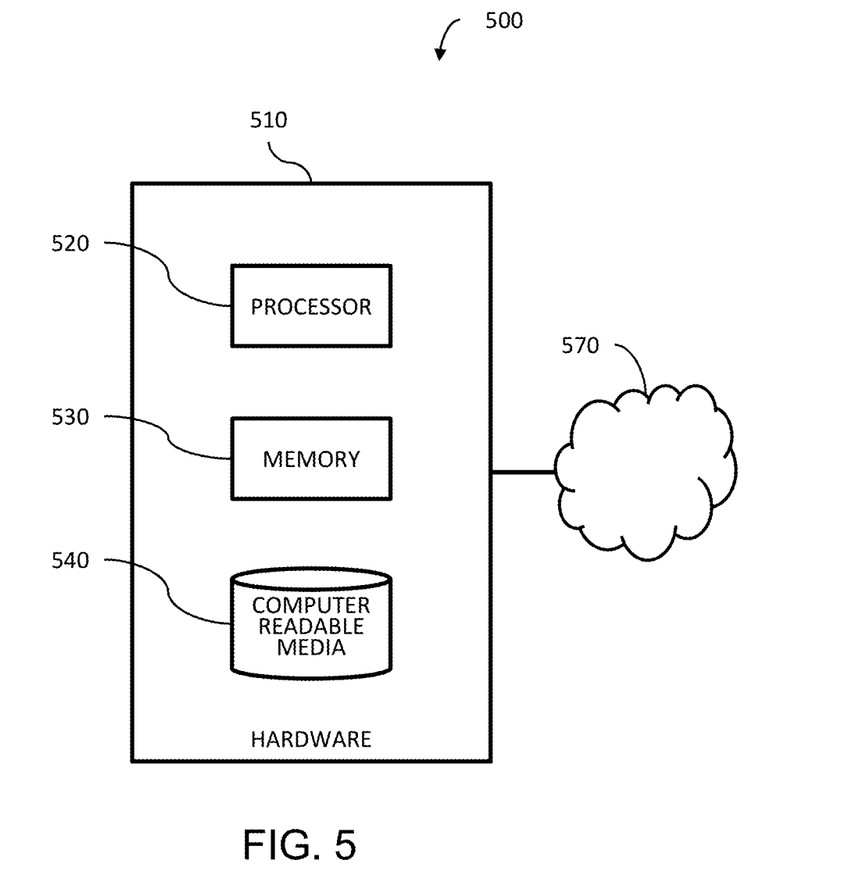
FIG. 5 is a block diagram showing a system in accordance with embodiments of the present disclosure.

The elements of the methodology as described above may be implemented in computer hardware comprising a stand-alone unit or a plurality of units linked by a network or a bus. For example, the network elements and virtual machines described above may be instantiated using computing systems such as the exemplary computing system 500 is shown in FIG. 5.

A computing apparatus 510 may be a mainframe computer, a desktop or laptop computer or any other device or group of devices capable of processing data. The computing apparatus 510 receives data from any number of data sources that may be connected to the apparatus. For example, the computing apparatus 510 may receive input from a wide area network 570 such as the Internet, via a local area network or via a direct bus connection.

The computing apparatus 510 includes one or more processors 520 such as a central processing unit (CPU) and further includes a memory 530. The processor 520 is configured using software according to the present disclosure.

The memory 530 functions as a data memory that stores data used during execution of programs in the processor 520, and is also used as a program work area. The memory 530 also functions as a program memory for storing a program executed in the processor 520. The program may reside on any tangible, non-volatile computer-readable media 540 as computer readable instructions stored thereon for execution by the processor to perform the operations.

Generally, the processor 520 is configured with program modules that include routines, objects, components, data structures and the like that perform particular tasks or implement particular abstract data types. The term "program" as used herein may connote a single program module or multiple program modules acting in concert. The disclosure may be implemented on a variety of types of computers, including personal computers (PCs), hand-held devices, multi-processor systems, microprocessor-based programmable consumer electronics, network PCs, mini-computers, mainframe computers and the like, and may employ a distributed computing environment, where tasks are performed by remote processing devices that are linked through a communications network. In a distributed computing environment, modules may be located in both local and remote memory storage devices.

An exemplary processing module for implementing the methodology above may be stored in a separate memory that is read into a main memory of a processor or a plurality of processors from a computer readable medium such as a ROM or other type of hard magnetic drive, optical storage, tape or flash memory. In the case of a program stored in a memory media, execution of sequences of instructions in the module causes the processor to perform the process operations described herein. The embodiments of the present disclosure are not limited to any specific combination of hardware and software and the computer program code required to implement the foregoing can be developed by a person of ordinary skill in the art.

The term "computer-readable medium" as employed herein refers to a tangible, non-transitory machine-encoded medium that provides or participates in providing instructions to one or more processors. For example, a computer-readable medium may be one or more optical or magnetic memory disks, flash drives and cards, a read-only memory or a random access memory such as a DRAM, which typically constitutes the main memory. The terms "tangible media" and "non-transitory media" each exclude propagated signals, which are not tangible and are not non-transitory. Cached information is considered to be stored on a computer-readable medium. Common expedients of computer-readable media are well-known in the art and need not be described in detail here.

CONCLUSION

Utilizing cloud-based storage for buffering data used for CDR generation will provide a more stable and scalable solution with less expense over the long-term than the local host-based storage solution supported today. This is also in keeping with the emerging industry trend to migrate more computing tasks to the cloud.

The forgoing detailed description is to be understood as being in every respect illustrative and exemplary, but not restrictive, and the scope of the disclosure herein is not to be determined from the description, but rather from the claims as interpreted according to the full breadth permitted by the patent laws. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings. It is to be understood that various modifications will be implemented by those skilled in the art, without departing from the scope and spirit of the disclosure.

What is claimed is:

1. A method for providing network resource usage information in an Internet Protocol multimedia subsystem, comprising:
   by a network element of the Internet Protocol multimedia subsystem, generating network resource usage information based on an observation of network resource usage;
   transmitting the network resource usage information to a cloud-based storage service for buffering;
   determining that a charging collection function has become available to receive the network usage information for generating call detail records;
   when the charging collection function becomes available to receive the network usage information for generating call detail records, retrieving the network resource usage information from the cloud-based storage service;
   transmitting the network resource usage information to the charging collection function for generation of call detail records;
   receiving an acknowledgement from the charging collection function that the network resource usage information was successfully transmitted; and
   only after receiving the acknowledgement, clearing the network resource usage information from the cloud-based storage service.

2. The method of claim 1 wherein generating network resource usage information based on an observation of network resource usage comprises generating a Diameter Accounting Request message.

3. The method of claim 1, further comprising:
   in parallel with transmitting the network resource usage information to a cloud-based storage service for buffering, attempting to transmit the network resource usage information to the charging collection function.

4. The method of claim 1, further comprising:
   moving the network element of the Internet Protocol multimedia subsystem from a first virtualized host to a second virtualized host; and
   wherein transmitting the network resource usage information is performed by the first virtualized host before the moving, and retrieving the network resource usage information is performed by the second virtualized host after the moving.

5. The method of claim 1 wherein generating network resource usage information based on an observation of network resource usage is performed by a charging trigger function of the network element.

6. The method of claim 1, further comprising
   by the charging collection function, generating call detail records from the network resource usage information; and
   by the charging collection function, transmitting the call detail records to an operations support system or business support system.

7. A network element of an Internet Protocol multimedia subsystem, comprising:
   a processor;
   a network interface; and
   a computer readable storage device having stored thereon computer readable instructions that, when executed by the processor, cause the processor to perform operations for providing network resource usage information comprising:
      generating a network resource usage information based on an observation of network resource usage;
      transmitting the network resource usage information via the network interface to a cloud-based storage service for buffering;
      determining that a charging collection function has become available to receive the network usage information for generating call detail records;
      when the charging collection function becomes available to receive the network usage information for generating call detail records, retrieving the network resource usage information from the cloud-based storage service;
      transmitting the network resource usage information via the network interface to the charging collection function for generation of call detail records;
      receiving an acknowledgement from the charging collection function that the network resource usage information was successfully transmitted; and
      only after receiving the acknowledgement, clearing the network resource usage information from the cloud-based storage service.

8. The network element of claim 7 wherein generating network resource usage information based on an observation of network resource usage comprises generating a Diameter Accounting Request message.

9. The network element of claim 7 wherein retrieving the network resource usage information from the cloud-based storage service is performed periodically.

10. The network element of claim 7, wherein the network element comprises a virtual machine instantiated in a virtualized environment.

11. The network element of claim 10, wherein the operations further comprise:
- moving the network element of the Internet Protocol multimedia subsystem from a first virtualized host to a second virtualized host; and
- wherein transmitting the network resource usage information is performed by the first virtualized host before the moving, and retrieving the network resource usage information is performed by the second virtualized host after the moving.

12. The network element of claim 7 wherein generating network resource usage information based on an observation of network resource usage is performed by a charging trigger function of the network element.

13. A tangible computer-readable medium having stored thereon computer readable instructions for providing network resource usage information in an Internet Protocol multimedia subsystem, wherein execution of the computer readable instructions by a processor causes the processor to perform operations comprising:
- generating network resource usage information based on an observation of network resource usage;
- transmitting the network resource usage information to a cloud-based storage service for buffering;
- determining that a charging collection function has become available to receive the network usage information for generating call detail records;
- when the charging collection function becomes available to receive the network usage information for generating call detail records, retrieving the network resource usage information from the cloud-based storage service;
- transmitting the network resource usage information to the charging collection function for generation of call detail records;
- receiving an acknowledgement from the charging collection function that the network resource usage information was successfully transmitted; and
- only after receiving the acknowledgement, clearing the network resource usage information from the cloud-based storage service.

14. The tangible computer-readable medium of claim 13 wherein generating network resource usage information based on an observation of network resource usage comprises generating a Diameter Accounting Request message.

15. The tangible computer-readable medium of claim 13 wherein retrieving the network resource usage information from the cloud-based storage service is performed periodically.

16. The tangible computer-readable medium of claim 13, wherein the network element comprises a virtual machine instantiated in a virtualized environment.

17. The tangible computer-readable medium of claim 16, wherein the operations further comprise:
- moving the network element of the Internet Protocol multimedia subsystem from a first virtualized host to a second virtualized host; and
- wherein transmitting the network resource usage information is performed by the first virtualized host before the moving, and retrieving the network resource usage information is performed by the second virtualized host after the moving.

* * * * *